(12) United States Patent
Grady et al.

(10) Patent No.: US 12,443,249 B2
(45) Date of Patent: Oct. 14, 2025

(54) HYBRID DRIVE CARRIER FRAME (71) Applicant: HEWLETT PACKARD ENTERPRISE DEVELOPMENT LP, Spring, TX (US)

(72) Inventors: John R. Grady, Cypress, TX (US); Kevin Frank Labbe, Tomball, TX (US); Keith Allen Sauer, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 155 days.

(21) Appl. No.: 18/159,840

(22) Filed: Jan. 26, 2023

(65) Prior Publication Data

US 2024/0256006 A1 Aug. 1, 2024

(51) Int. Cl.
*G06F 1/18* (2006.01)
*G11B 33/12* (2006.01)

(52) U.S. Cl.
CPC ............ *G06F 1/187* (2013.01); *G11B 33/124* (2013.01); *G11B 33/128* (2013.01)

(58) Field of Classification Search
CPC ....... G06F 1/187; G06F 1/186; G11B 33/128; G11B 33/124; H05K 7/1402; H05K 7/1409
See application file for complete search history.

(56) References Cited

U.S. PATENT DOCUMENTS

| | | | |
|---|---|---|---|
| 6,067,225 A * | 5/2000 | Reznikov | H05K 7/1418 |
| 6,185,106 B1 * | 2/2001 | Mueller | H05K 7/1409 361/801 |
| 7,272,012 B2 * | 9/2007 | Salinas | H05K 7/1411 312/223.1 |
| 7,782,606 B2 * | 8/2010 | Baker | G11B 33/124 361/679.33 |
| 8,297,574 B2 * | 10/2012 | Zhang | G11B 33/124 361/679.02 |
| 8,300,398 B2 * | 10/2012 | Zhang | G06F 1/187 361/679.33 |
| 9,360,902 B1 * | 6/2016 | Yang | G06F 1/187 |
| 9,383,784 B2 * | 7/2016 | Lo | G06F 1/187 |
| 9,392,719 B1 * | 7/2016 | Chen | G11B 33/124 |
| 9,420,718 B2 * | 8/2016 | Du | H05K 3/325 |
| 9,442,538 B1 * | 9/2016 | Chen | G06F 1/187 |
| 9,477,273 B2 * | 10/2016 | Scherer | G06F 1/187 |
| 9,958,912 B2 * | 5/2018 | Chen | G11B 33/124 |

(Continued)

*Primary Examiner* — Nidhi Thaker
(74) *Attorney, Agent, or Firm* — Jones Robb PLLC (57) ABSTRACT

A hybrid drive carrier frame includes a front rail comprising a first end, a second end, and a body extending along a transverse direction between the first and second ends. The frame comprises a first side rail extending from the first end of the front rail perpendicular to the transverse direction and a second side rail extending from the second end of the front rail perpendicular to the transverse direction and parallel to the first side rail. The first side rail is formed from a metal material and includes a locking tab extending along the transverse direction. The front and second side rails are formed from a plastic material. The front rail includes a locking channel at the first end of the front rail and the first side rail is connected to the first end of the front rail via engagement of the locking tab within the locking channel.

20 Claims, 7 Drawing Sheets

(56) References Cited

U.S. PATENT DOCUMENTS

| | | |
|---|---|---|
| 10,228,734 B1 | 3/2019 | Hsieh et al. |
| 10,437,296 B1 * | 10/2019 | Long .................... G06F 1/187 |
| 11,311,114 B1 * | 4/2022 | Fleisher ............... A47C 27/065 |
| 2003/0206402 A1 * | 11/2003 | Tsuyuki ............... G11B 33/128 |
| 2015/0277510 A1 | 10/2015 | Farrow et al. |
| 2017/0147042 A1 * | 5/2017 | Liu ....................... G11B 33/128 |
| 2019/0075668 A1 * | 3/2019 | Adrian ..................... H05K 5/13 |
| 2019/0174642 A1 * | 6/2019 | Choyikkunnil .......... H05K 5/10 |

* cited by examiner

HYBRID DRIVE CARRIER FRAME

INTRODUCTION

Computer systems may include one or more media drives such as, solid state drives ("SSDs"), hard disk drives ("HDDs"), CD ROM drives, or DVD drives. One or more receiving locations can be included in the chassis of a computer for receiving these drives. The media drives can either be directly mounted within those receiving locations, or may be first received in a carrier, which is itself receivable in the receiving location. A drive carrier may be used, for example, in a computing system (e.g., a server, a high-performance-compute system, a data storage appliance, a converged or hyperconverged system, or other computing systems) to facilitate installation and uninstallation (e.g., hot-swapping) of a media drive to the computing system. In this manner, a drive carrier may be used to configure a media drive, such as an SSD, as a field replaceable unit (FRU) to make the media drive hot pluggable.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

DETAILED DESCRIPTION

Drive carriers are used to configure media drives, such as SSDs, as FRUs, allowing the drives to be hot swapped into a computing system. Drive carriers are therefore defined by the physical form of the SDD, or drive, which they are configured to carry and are standardized by an industry form factor (e.g., an SDD form factor). An Enterprise & Data Center Standard Form Factor (EDSFF), for example, is designed for use in data centers in servers with storage devices such as SSDs. As a form factor, it defines specifications such as the dimensions and electrical interfaces storage devices should have, to ensure data center operators, server manufacturers, and SSD manufacturers, can make products that work with products from multiple manufacturers. As used herein, an EDSFF drive therefore refers to a drive that has a form factor specified in one of the standards in the EDSFF family of standards, including, but not limited to, a form factor specified in SFF-TA-1006, SFF-TA-1007, or SFF-TA-1008, and an EDSFF drive carrier is a drive carrier configured to carry and support an EDSFF drive.

Due to the small size of emerging EDSFF technologies, drive carriers designed to support EDSFF drives (EDSFF drive carriers) are significantly smaller than those designed for previous drive technologies. The small size of such drive carriers raises various new issues. Given the larger size of previous drives, in the past, it was possible to manufacture all parts of a drive carrier using low-cost plastic materials, while still achieving the necessary strength and durability requirements for the carrier (e.g., by increasing wall thickness, etc.). As the size of the drive carrier decreases, however, it becomes increasingly difficult to provide both a low-cost and robust drive carrier, which can accommodate aggressive handling by users, e.g., through repetitive hot swapping of SDDs, without being damaged. The area of the drive carrier where a handle of the drive carrier interfaces with a frame of the drive carrier may, for example, be particularly subjected to high forces due to torque from repetitive handle operation, making it unfeasible to continue to use traditional drive carrier designs that only use plastic materials.

To address the challenges associated with small drive carriers, including EDSFF drive carriers, the present disclosure contemplates an improved drive carrier frame and assembly that are, among other things, designed to mitigate the impact of the high forces that can occur at the interface of the drive carrier handle and the drive carrier frame, while also minimizing the manufacturing costs for the assembly. Examples disclosed herein may utilize a two-piece (i.e., hybrid) drive carrier frame, in which, a first frame section is manufactured using a more robust metal material, while a second section of the frame is still manufactured using a low-cost plastic material. The first metal frame section may, for example, include a first side rail and be configured to interface with a handle, and the second plastic frame section may include both a front rail and a second side rail, such that, when the two frame sections are connected (i.e., assembled together), the front rail in conjunction with the first and second side rails together form a drive carrier frame configured to receive and carry an EDSFF drive.

In some implementations, the first frame section, which includes the handle interface, may be formed from a die cast zinc, while the second frame section may be formed from a polycarbonate, like that typically used for previous drive carrier applications. In this manner, the handle interface portion of the drive carrier frame (e.g., which is made of a die cast zinc) has an increased yield strength compared to previous polycarbonate designs, such that the handle interface may better withstand the high torques imparted on the drive carrier frame by the drive carrier handle, while a majority of the frame is still manufactured using a low-cost polycarbonate to reduce manufacturing costs (as compared to manufacturing the entire frame from a metal). To further strengthen an area of the handle interface, in some implementations, the two frame sections may be assembled via a locking mechanism, including a locking tab on the first frame section that is configured to slide into a locking channel in the second frame section such that hook receptacles on the locking tab engage retention hooks in the locking channel, and which may be reinforced by an additional retainer. This contemplated locking mechanism design, which in the assembled state of the drive carrier frame is positioned adjacent the handle interface, may help to prevent unwanted rotation of the handle interface and/or the first side rail when torque is applied to the drive carrier handle. In some implementations, the disclosed hybrid drive carrier frame may be utilized in combination with a handle that is also manufactured from a metal material, such as, for example, a die cast zinc, to prevent the handle itself from yielding under the stresses it experiences during use.

Turning now to the figures, various frames, devices, and methods in accordance with aspects of the present disclosure will be described.

Figure 1:
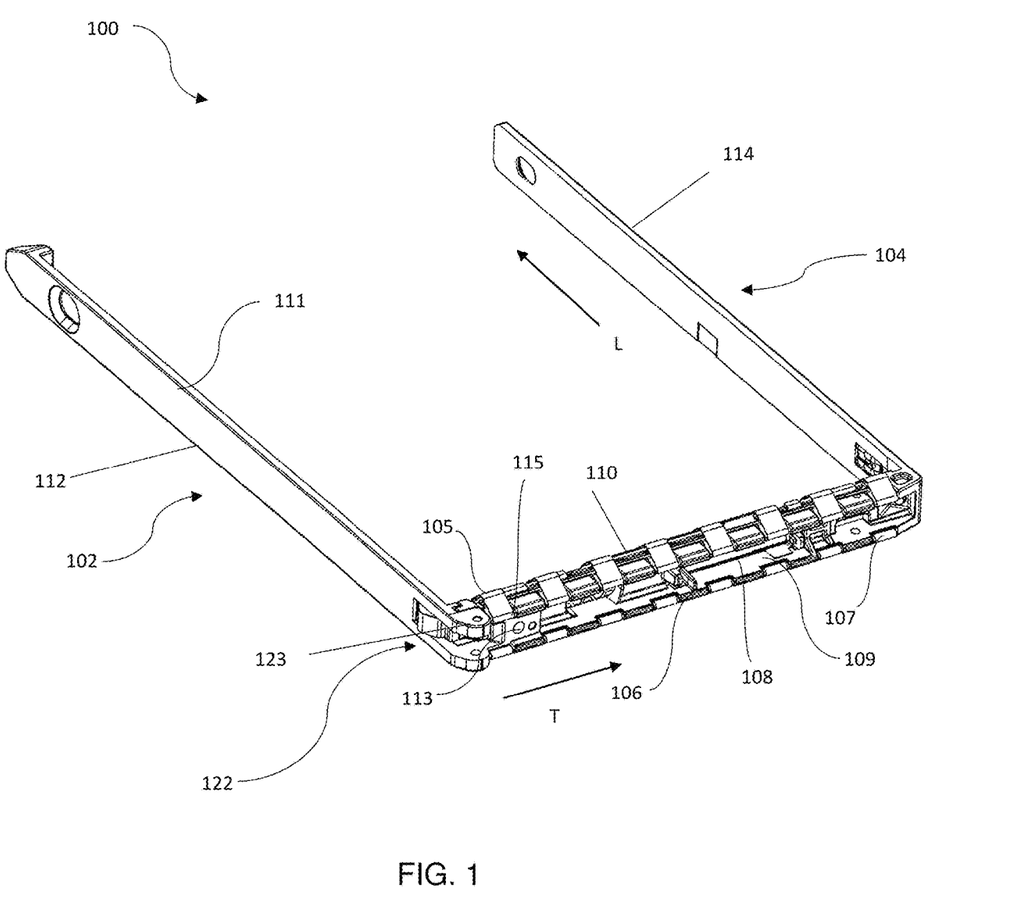
FIG. 1 is a top perspective view illustrating a hybrid drive carrier frame.

FIG. 1 is a top perspective view illustrating a hybrid drive carrier frame 100 referred to also as "frame 100." As shown in FIG. 1, the frame 100 comprises a hybrid, two-piece construction including a first frame section 102 that is made from a metal material and a second frame section 104 that is made from a plastic material. The first and second frame sections 102 and 104 are connected, such that together they form a structure configured to receive and carry a media drive for an electronic device (e.g., a computing device), including, but not limited to an SSD. In one implementation, as described further below, the frame 100 is configured to receive and carry an EDSFF drive. It should be understood, however, that FIG. 1 is not intended to illustrate specific shapes, dimensions, or other structural details accurately or to scale, and that implementations of the frame 100 may have different numbers and arrangements of the illustrated components and may also include other parts that are not illustrated. Furthermore, it should be understood that the disclosed frame 100 may be used to carry various types and configurations of media drives, having different shapes, dimensions, and features, and is not intended to be restricted to a particular drive technology.

The frame 100, for example, includes a front rail 106 comprising a first end portion 105, a second end portion 107, and a body 108 extending along a transverse direction T between the first and second end portions 105 and 107. The frame 100 also includes a first side rail 112 extending from the first end portion 105 of the front rail 106 along a longitudinal direction L perpendicular to the transverse direction T and a second side rail 114 extending from the second end portion 107 of the front rail 106 along the longitudinal direction L perpendicular to the transverse direction and parallel to the first side rail 112. In this manner, the front rail 106 in conjunction with the first and second side rails 112 and 114 together form a frame 100 that is configured to receive a substantially cuboid shaped drive 170 (see, e.g., FIG. 10, e.g., in an open space defined between the first and second side rails 112 and 114) and to carry the drive 170 for insertion into a substantially cuboid shaped drive bay 210 (see, e.g., FIG. 10). The body 108 of the front rail 106, for example, includes a front face 109 and a back face 110, and in a state of the drive 170 mounted to the frame 100 the back face 110 is adjacent to and faces the drive 170. The first and second side rails 112 and 114 are configured to slide into the drive bay 210 (see, e.g., FIG. 10), and in an installed state of the frame 100 in the drive bay 210 the front face 109 is accessible to a user (i.e., facing towards an exterior of the device 200 (see e.g., FIG. 10) that comprises the drive bay 210). As shown, in FIGS. 8 and 9, a handle 150 may, for example, be attached to the frame 100 for insertion and removal of the frame 100 into/from the drive bay 210 (the handle 150 is described in greater detail below). As discussed further below, the first side rail 112 may include a handle interface 122 positioned adjacent to the front face 109 of the front rail 106, for attachment of the handle 150 to the frame 100.

In various implementations, the first frame section 102 includes the first side rail 112 and the second frame section 104 includes both the front rail 106 and the second side rail 114. Thus, in such implementations, the first side rail 112 (including the handle interface 122) is formed from a metal material and the front rail 106 and second side rail 114 are formed from a plastic material. The first side rail 112 may, for example, be formed from a die cast zinc, while the front rail 106 and the second side rail 114 may, for example, be integrally formed together from a polycarbonate. The first side rail 112 is, therefore, formed from a material having a higher yield strength when compared to traditional polycarbonate materials, such that the first frame section 102, which encompasses the handle interface 122, is better configured to withstand the forces imparted on the frame 100 by the drive carrier handle 150. In such implementations, for example, the hybrid frame 100 (which includes a first frame section 102 formed from a metal material) may withstand about 17.8 in·lbs of torque imparted on the frame 100 by the drive carrier handle 150, in comparison to a plastic frame (in which all frame sections are formed from a plastic material) that can withstand about 9.27 in·lbs of torque imparted on the frame by the handle. In other words, utilizing the above-described hybrid frame construction, which includes a first frame section 102 formed from a metal material, may increase the yield strength of the drive carrier frame 100 by about 92%.

It should be understood, however, that the disclosed frame sections 102 and 104 may be formed from various respective metal and plastic materials, such that the first frame section 102 has increased strength characteristics in comparison to the second frame section 104, and are not intended to be restricted to particular material types. For example, in some implementations, the first side rail 112 is formed from a die cast aluminum or magnesium. Furthermore, in some implementations, the front rail 106 and second side rail 114 are formed from polycarbonate/acrylonitrile butadiene styrene (PC-ABS).

Figure 4:
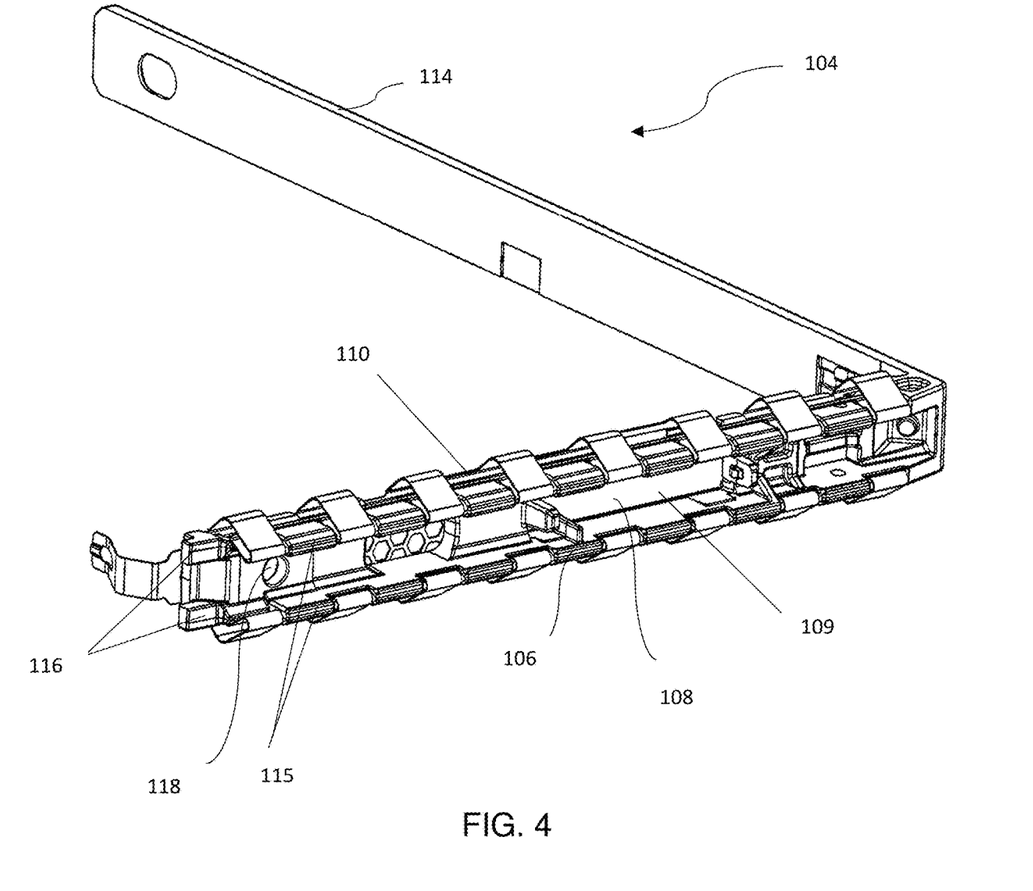
FIG. 4 is a perspective view of a front and second side rail of the hybrid drive carrier frame of FIG. 1.
Figure 6A:
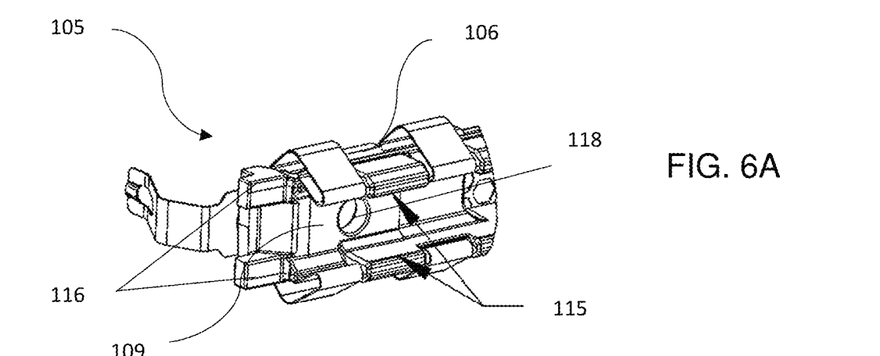
FIG. 6A is an enlarged view of a locking channel portion of the front rail of FIG. 4.
Figure 7:
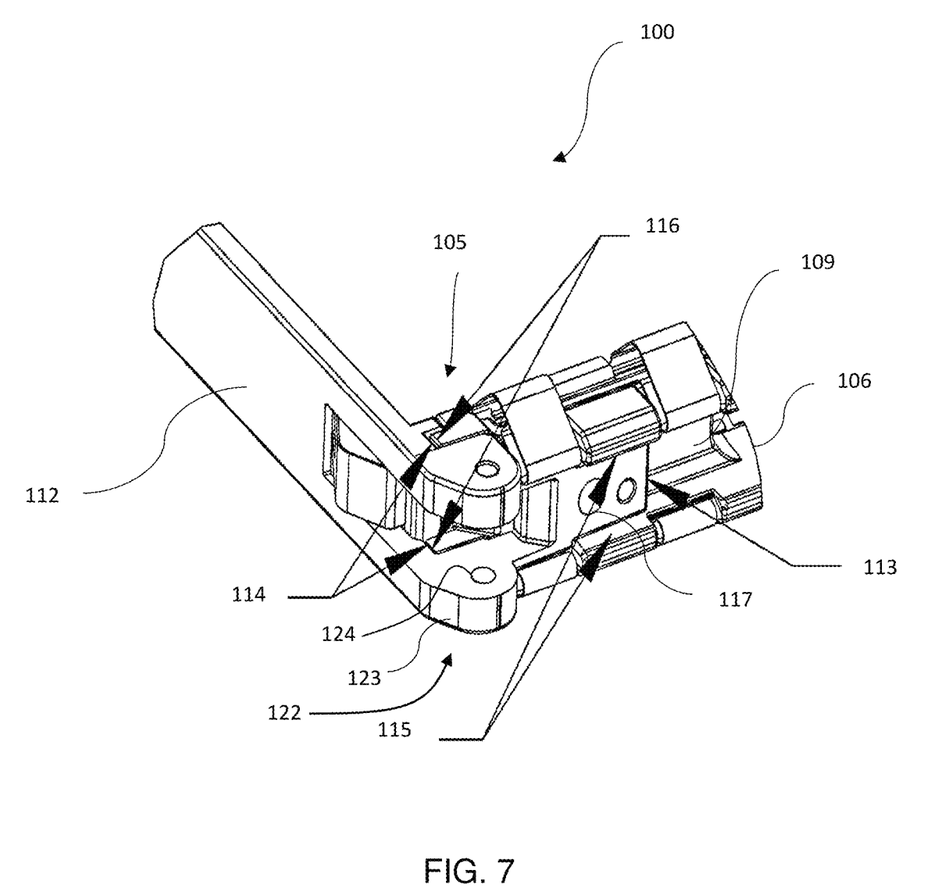
FIG. 7 is an enlarged, partial view of the drive carrier frame of FIG. 1, illustrating the locking tab portion of FIG. 3B engaged with the locking channel portion of FIG. 6A.

In some implementations, the first and second frame sections 102 and 104 are assembled, or connected to form the frame 100, via engagement of a locking tab on the first frame section 102 with a locking channel on the second frame section 104, and then secured together, via screwing of the locking tab within the locking channel. As illustrated, for example, in FIGS. 1, 2, 3A, and 3B, the first side rail 112 may include a locking tab 113 extending from a body 111 of the first side rail 112 along the transverse direction T, and as illustrated in FIGS. 4 and 6A the front face 109 of the front rail 106 may include a locking channel 115 at the first end portion 105 of the front rail 106. In this manner, as illustrated by the assembled frame 100 of FIGS. 1 and 7, the first side rail 112 is initially connected to the first end portion 105 of the front rail 106 via engagement of the locking tab 113 within the locking channel 115.

Figure 5:
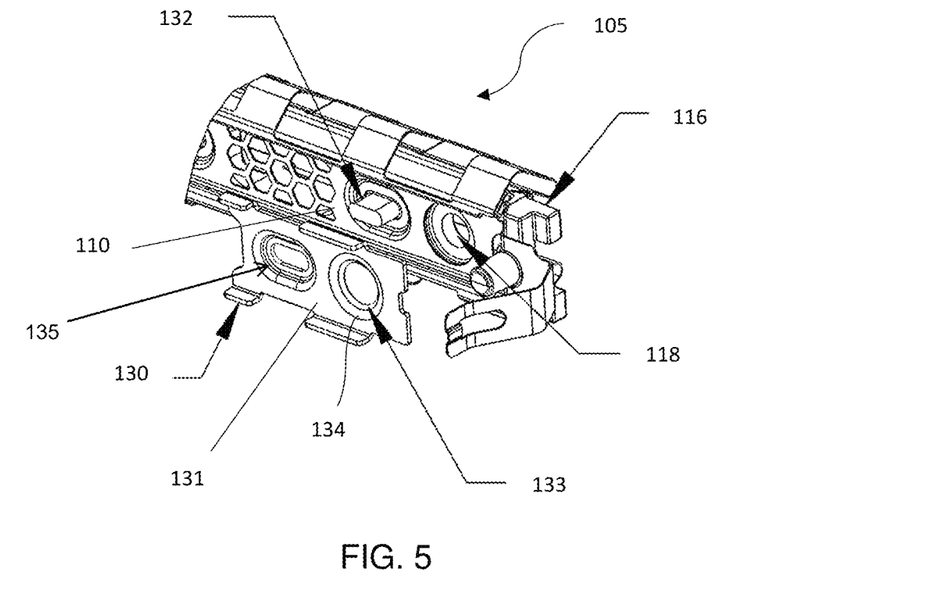
FIG. 5 is an exploded, enlarged, view of a retainer that assembles to the back side of the front rail of FIG. 4.
Figure 6B:
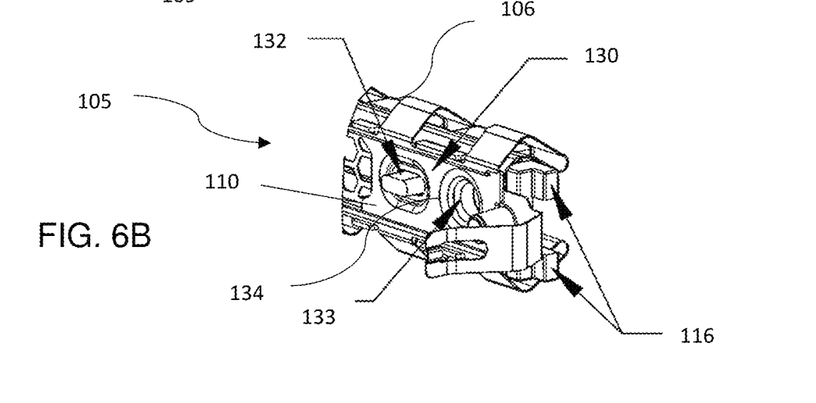
FIG. 6B is an enlarged view of the assembled retainer on the back side of the front rail of FIG. 4.

To secure the locking tab 113 within the locking channel 115, the locking tab 113 is then screwed within the locking channel 115. As illustrated in the exploded views of FIGS. 8 and 9, in one implementation, the frame 100 may include a retainer 130 that is affixed to the back face 110 of the front rail 106 and opposite to the locking tab 113 (i.e., which extends within the locking channel 115 along the front face 109 of the front rail 106) of the first side rail 112. As illustrated best perhaps in the exploded, enlarged view of FIG. 5, assembly of the retainer 130, which may comprise a metal plate 131, such as, for example, a stainless-steel plate 131, is accomplished by inserting a heat staking post 132 (e.g., which is molded into the back face 110 of the front rail 106) through a heat stake receptacle 135 in the retainer 130 and permanently joining the retainer 130 to the plastic material of the front rail 106 via heat staking (e.g., via the heating and reforming of the heat staking post 132 over the retainer 130). As further shown in FIG. 6B, the retainer 130 may also have a screw hole 133, such that when the retainer 130 is heat staked onto the back face 110 of the front rail 106, the screw hole 133 is aligned with a screw clearance hole 118 in the front rail 108 and, after connection of the first side rail 112 to the front rail 108, the respective screw holes 133 and 118, and a threaded screw hole 117 in the locking tab 113, are all aligned. The screw hole 133 includes, for example, an embossed screw form 134 that matches the head geometry of a flat head screw 140, such as, for example, a flat head M2 screw 140, that is inserted through the respective aligned holes 133 and 118, and fastened into the threaded screw hole 117, to secure the locking tab 113 to the front face 106.

Figure 8:
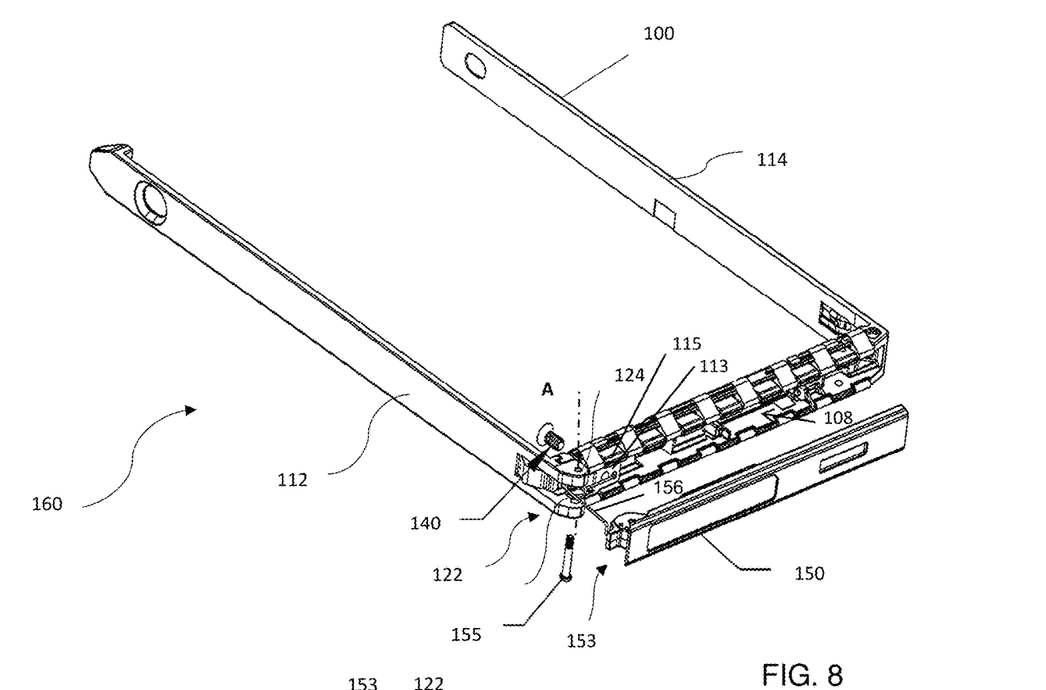
FIG. 8 is an exploded, top perspective view illustrating a hybrid drive carrier frame and handle assembly.

The retainer 130/screw 140 assembly, therefore, functions to lock the first frame section 102 to the second frame section 104, while also providing added strength to the frame 100 in the area surrounding the handle interface 122. As illustrated in FIG. 8, for example, since the front rail 108 is made from a plastic that is relatively thin, particularly in the channel 115 in which the locking tab 113 is received, without reinforcement the front rail 108 may not be strong enough to resist the forces/torques exerted on the frame 100 during use (e.g., that may urge the locking tab 113 away from the channel 115 when force is applied to the first side rail 112 in the direction T). For example, if a screw were inserted through the screw hole 118 to engage with locking tab 113, without the retainer 130, a head of the screw could potentially tear through the screw hole 118 when exposed to the types of forces that are expected during normal usage of the frame 100. The retainer 130 may, however, prevent the screw head from tearing through the front rail 108 by distributing the forces across a much larger area of the front rail 108 than the area contacted by the screw head alone. Thus, in effect, the front rail 108 is clamped between the locking tab 113 and the retainer 130 (via the screw), rather than merely being held together by the engagement of the screw head with the front rail alone.

Figures 2, 3A, 3B:
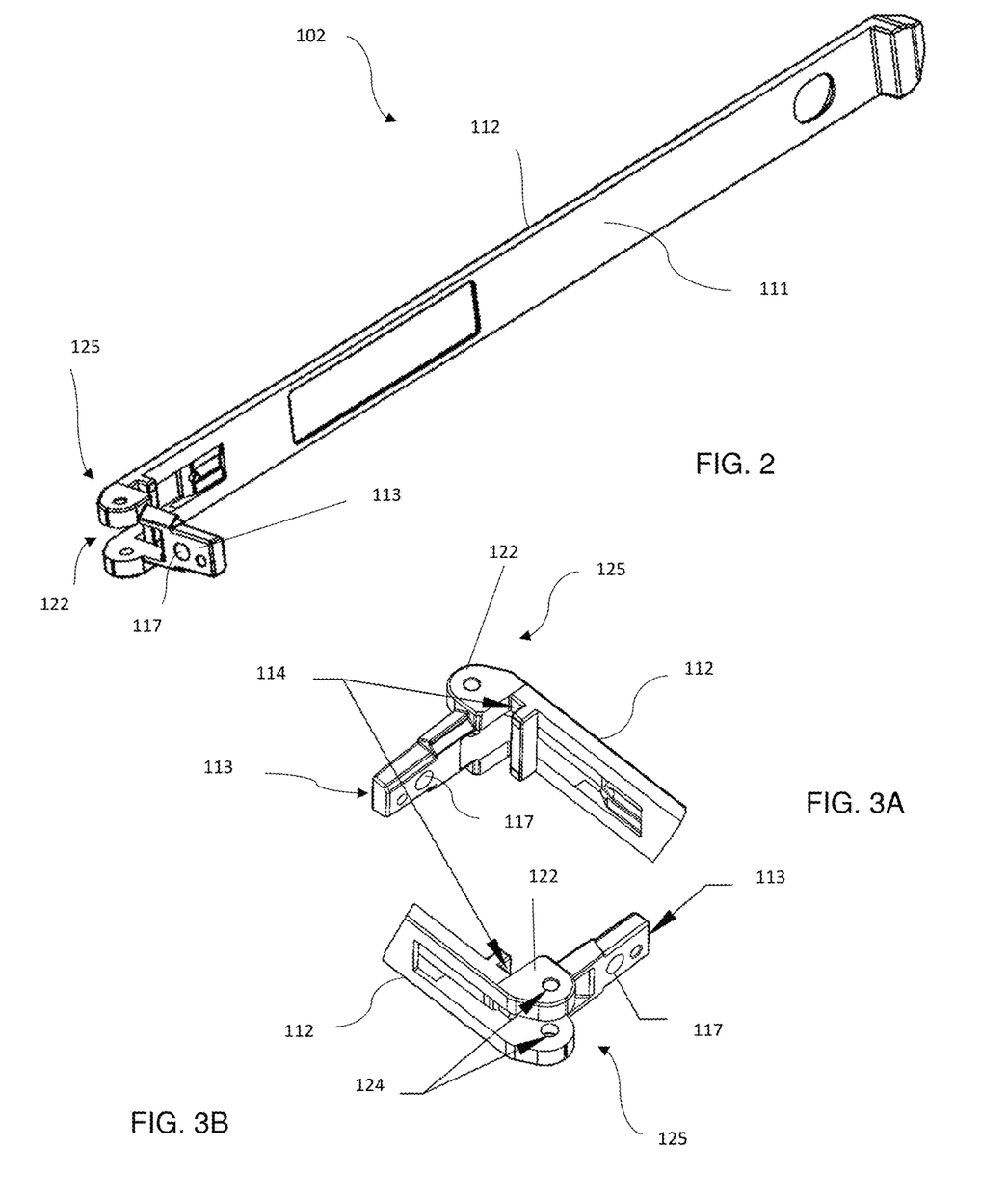
FIG. 2 is a perspective view of a first side rail of the drive carrier frame of FIG. 1.
FIGS. 3A and 3B are enlarged views of a locking tab portion of the side rail of FIG. 2.

In some implementations, the frame 100 may include various additional features to secure the locking tab 113 within the locking channel 115. In one example, as shown in the enlarged views of FIGS. 3A, 3B, 6A, and 6B, the front rail 106 includes one or more retention hooks 116, for example, two retention hooks 116 molded into the plastic material of the front rail 106, at the first end portion 105 of the front rail 106 (FIGS. 6A and 6B), and the first side rail 112 includes one or more corresponding hook receptacles 114, for example, a notch 114 molded into the metal material of the body 111 of the first side rail 112 (FIGS. 3A and 3B). Consequently, as illustrated in the enlarged view of FIG. 7, when connecting the first side rail 112 to the front rail 106 (i.e., when connecting the first frame section 102 to the second frame section 104), the locking tab 113 is slid into the locking channel 115 until the retention hooks 116 are fully engaged within the notch 114. Engagement of the hooks 116 within the notch 114, for example, helps to prevent relative movement between the first and second frame sections 102 and 104 in the longitudinal direction L, thereby helping to secure the frame sections 102 and 104 together. In this fully installed position, as discussed above, the threaded screw hole 117 in the locking tab 113 is aligned with the corresponding screw hole 118 in the front rail 106.

As perhaps best illustrated in the isolated and enlarged views of FIGS. 2, 3A, and 3B, the handle interface 122 may, for example, be positioned at an end 125 of the body 111 of the first side rail 102, such that the handle interface is positioned adjacent to the locking tab 113 of the first side rail 102. Such a connection may, for example, not only facilitate proper alignment of the first side rail 112 with the front rail 106 during assembly of the frame 100 (i.e., during connection of the first frame section 102 to the section frame section 104), but may also help prevent unwanted rotation of the handle interface 122 and the first side rail 112 during use.

As discussed above, the contemplated drive carrier frame 100 is further configured to interface with a drive carrier handle at the handle interface 122. During assembly, as further illustrated in FIGS. 8 and 9, the handle interface 122 is configured, for example, to receive a drive carrier handle 150. To help prevent the drive carrier handle 150 from yielding under the high stresses it experiences during use, similar to the handle interface 122/first side rail 112, the drive carrier handle 150 may also be manufactured from a metal material, such as, for example, a die cast zinc. The drive carrier handle 150 also includes a tang 153 at one end portion thereof, with the tang 153 comprising a hole 154 (or a number of holes 154 aligned with one another) for receiving a pin 155 to pivotably couple the drive carrier handle 150 to the frame 100. In particular, in some implementations, the handle interface 122 includes a clevis 123 (see FIGS. 7-9) that is configured to receive the tang 123 of the drive carrier handle 150, and the clevis 122 comprises holes 124 configured to align with the holes 154 when the tang 123 is received in the clevis 122. Thus, the pin 155 can be inserted through the aligned holes 154 and 124 and configured, for example, with a spring 156 to pivotably connect the drive carrier handle 150 to the drive carrier frame 100. The pin 155 creates a pivot point between the frame 100 and the handle 150 along a pivot axis A (shown in FIG. 8) that is generally perpendicular to a longitudinal dimension of the body 108 of the front rail 106 and generally perpendicular to a longitudinal dimension of the body 111 of the side rail 112 (i.e., generally perpendicular to the transverse direction T and to the longitudinal direction L). Due to its relatively high yield strength, when compared for example to cold rolled steel, the pin 155 may, for example, be made from stainless-steel.

Figure 9:
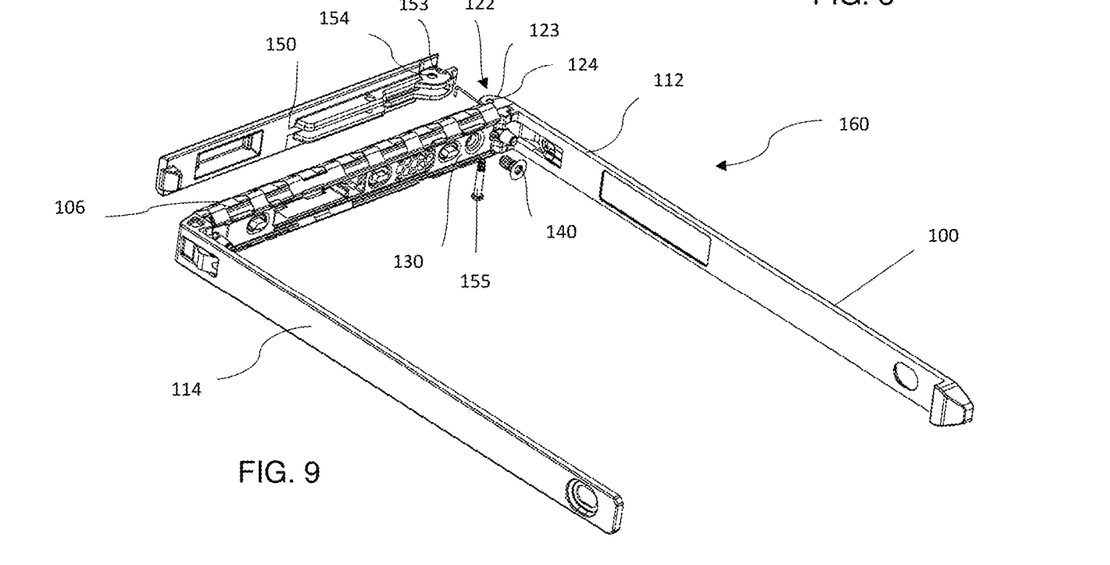
FIG. 9 is an exploded, bottom perspective view of the assembly of FIG. 8.

It should be understood that the frame 100 may be configured to connect to the drive carrier handle 150 using various linking mechanisms and techniques, including, but not limited to the clevis connection described with reference to the embodiments of FIGS. 8 and 9. It should be further understood that the drive carrier handle 150 and pin 155 may be manufactured from various materials, including various metal materials, and are not limited to the die cast zinc and stainless-steel constructions discussed above.

Figure 10:
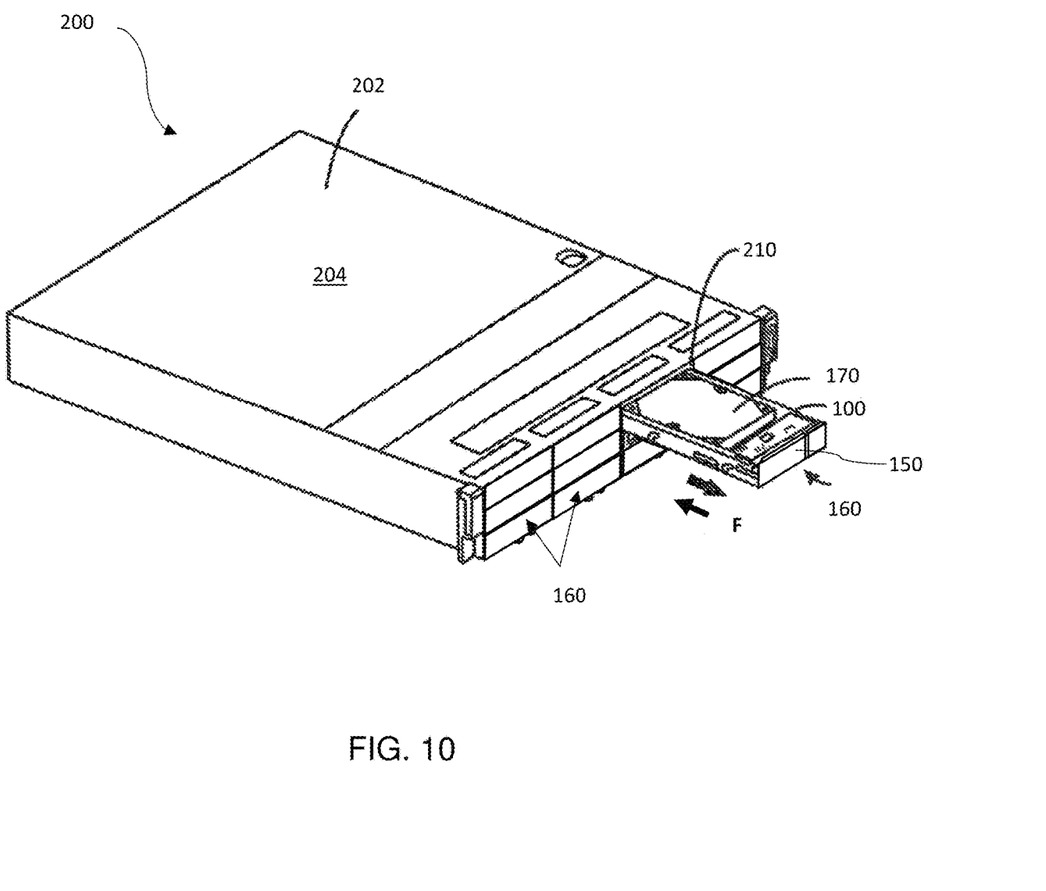
FIG. 10 is a perspective view illustrating a hybrid drive carrier extending out of a drive bay of an electronic device.

Turning now to FIG. 10, as discussed above, the frame 100 is configured to receive and carry, a media drive, including for example, an EDSFF drive 170, such that the drive 170 may be easily inserted/removed (i.e., hot swapped) from an electronic device 200 (e.g., a computing system). The perspective view of FIG. 10, for example, illustrates a drive carrier 160 (i.e., which includes the drive carrier frame 100 and drive carrier handle 150) extending out of a drive bay 210 of the electronic device 200. A computer enclosure, for example, a computer case 202, may be utilized to house most of the internal components of the electronic device 200, including but not limited to, a processor 204. In one implementation, the computing case 202 includes a plurality of drive bays 210, twelve drive bays 210 being shown in the embodiment of FIG. 10, which are configured to receive and interface with various computer hardware components, including, for example, media drives such as the EDSFF drive 170 carried by the drive carrier assembly 160. In this manner, as illustrated by arrows F in FIG. 10, each drive bay 210 is configured to removably house an individual drive carrier 160 for efficient insertion and removal of each media drive (e.g., EDSFF drive 170) from the computing device 200.

It should be understood, however, that FIG. 10 is not intended to illustrate specific shapes, dimensions, or other structural details accurately or to scale, and that implementations of the electronic device 200 may have different numbers and arrangements of drive bays 210 for receipt of different numbers and arrangements of drive carriers 160 and may also include other parts that are not illustrated. Furthermore, as discussed above, it should be understood that the disclosed drive carrier 160 may be used to carry various types and configurations of media drives, having different shapes, dimensions, and features, and is not intended to be restricted to a particular drive technology.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known structures, and techniques have not been shown or described in detail in order not to obscure the examples. Like numbers in two or more figures represent the same or similar elements.

Further, spatial, positional, and relational terminology used herein is chosen to aid the reader in understanding examples of the invention but is not intended to limit the invention to a particular reference frame, orientation, or positional relationship. For example, spatial, positional, and relational terms such as "up", "down", "transverse", "beneath", "below", "lower", "above", "upper", "proximal", "distal", "side," "front" "adjacent" and the like may be used herein to describe directions or to describe one element's or feature's spatial relationship to another element or feature as illustrated in the figures. These spatial terms are used relative to reference frames in the figures and are not limited to a particular reference frame in the real world. Thus, for example, the direction "up" in the figures does not necessarily correspond to an "up" in a world reference frame (e.g., away from the Earth's surface). Furthermore, if a different reference frame is considered than the one illustrated in the figures, then the spatial terms used herein may need to be interpreted differently in that different reference frame. For example, the direction referred to as "up" in relation to one of the figures may correspond to a direction that is called "down" in relation to a different reference frame that is rotated 180 degrees from the figure's reference frame. As another example, if a device is turned over 180 degrees in a world reference frame as compared to how it was illustrated in the figures, then an item described herein as being "above" or "over" a second item in relation to the Figures would be "below" or "beneath" the second item in relation to the world reference frame. Moreover, the poses of items illustrated in the figures are chosen for convenience of illustration and description, but in an implementation in practice the items may be posed differently.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

EDSFF drive: As used herein, "EDSFF drive" refers to a drive that has a form factor specified in one of the standards in the Enterprise & Data Center Standard Form Factor (EDSFF) family of standards, including, but not limited to, a form factor specified in SFF-TA-1006, SFF-TA-1007, or SFF-TA-1008.

Transverse: As used herein, transverse refers to a direction that extends between the first and second side rails across the drive carrier frame and is perpendicular to each of the first and second side rails (i.e., perpendicular to longitudinal dimensions of the rails). Thus, a transverse dimension of the drive carrier frame is a dimension thereof that is perpendicular to the direction of extent of each individual side rail, which can be but does not necessarily have to be the shorter dimension of the overall cuboid frame structure.

Longitudinal: As used herein, longitudinal refers to a direction that extends parallel to each of the first and second side rails (i.e., perpendicular to a transverse dimension of the front rail). Thus, a longitudinal dimension of the drive carrier frame is a dimension thereof that is parallel to the direction of extent of each individual side rail, which can be but does not necessarily have to be the longer dimension of the overall cuboid frame structure.

Heat staking: As used herein, heat staking refers to a pulsed-heat process that is used to join the metallic material of the retainer to the plastic material of the second frame section. During the process, plastic material from the second frame section is deformed using heat and force to affix the metal retaining plate to the plastic material.

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A hybrid drive carrier frame, comprising:
   a front rail comprising a first end portion, a second end portion, and a body extending along a transverse direction between the first and second end portions, the body of the front rail having a front face and a back face opposite the front face;
   a first side rail extending from the first end portion of the front rail perpendicular to the transverse direction; and
   a second side rail extending from the second end portion of the front rail perpendicular to the transverse direction and parallel to the first side rail, the front rail in conjunction with the first and second side rails together forming a frame configured to receive and carry a media drive;
   a retainer; and
   a fastener,
   wherein the first side rail is formed from a metal and includes a locking tab extending from a body of the first side rail along the transverse direction; and
   wherein the front rail and the second side rail are formed from a plastic material, the front face of the front rail including a locking channel at the first end portion of the front rail, the first side rail being connected to the first end portion of the front rail via engagement of the locking tab within the locking channel, and
   wherein the retainer is formed from a metal and is affixed to the back face of the front rail opposite the locking tab, and the fastener is engaged with the retainer and the locking tab such that the body of the front rail is clamped between the retainer and the locking tab.

2. The drive carrier frame of claim 1, wherein the front rail and the second side rail are integrally formed from a polycarbonate.

3. The drive carrier frame of claim 1, wherein the first side rail is formed from a die cast zinc.

4. The drive carrier frame of claim 1, wherein the front rail includes one or more retention hooks molded into the plastic material at the first end portion of the front rail, and wherein the first side rail includes one or more corresponding hook receptacles molded into the metal of the body of the first side rail, the first side rail being further connected to the first end portion of the front rail via engagement of the retention hooks within the hook receptacles.

5. The drive carrier frame of claim 1, a wherein the retainer is affixed to the back face of the front rail by heat staking.

6. The drive carrier frame of claim 1, wherein the retainer comprises a stainless-steel plate and the fastener comprises a screw, the first side rail being secured to the first end portion of the front rail via the screw inserted through respective aligned holes in each of the stainless plate and the front rail and fastened into the locking tab of the first side rail.

7. The drive carrier frame of claim 1, wherein the first side rail includes a handle interface positioned adjacent to the locking tab, the handle interface comprising a clevis configured to receive a pin to connect a drive carrier handle to the drive carrier frame.

8. A hybrid drive carrier frame assembly, comprising:
   the drive carrier frame of claim 7; and
   the drive carrier handle connected to the handle interface of the drive carrier frame, the drive carrier handle being formed from a metal material.

9. The assembly of claim 8, wherein the drive carrier handle includes a tang fitted within a space formed by the clevis of the handle interface, such that holes in the tang are aligned with holes in the clevis, and wherein the drive carrier handle is pivotably connected to the handle interface via a stainless-steel pin inserted through the aligned holes of the tang and clevis.

10. The assembly of claim 9, wherein the drive carrier handle is formed from a die cast zinc.

11. The drive carrier frame of claim 1, wherein the frame is configured to receive and carry a solid-state drive (SSD).

12. The drive carrier frame of claim 11, wherein the frame is configured to receive and carry an Enterprise & Data Center Standard Form Factor (EDSFF) SSD.

13. An electronic device, comprising: a processor; a plurality of drive bays, each drive bay of the plurality of drive bays being configured to removably receive a respective drive carrier; a drive carrier inserted within one of the plurality of drive bays, the drive carrier having a media drive mounted therein, the drive carrier comprising: a front rail comprising a first end portion, a second end portion, and a body extending along a transverse direction between the first and second end portions, the body of the front rail having a front face and a back face opposite the front face, a first side rail extending from the first end portion of the front rail perpendicular to the transverse direction; a second side rail extending from the second end portion of the front rail perpendicular to the transverse direction and parallel to the first side rail, the front rail in conjunction with the first and second side rails together framing the media drive; a retainer; a fastener; and a handle pivotably coupled to the first side rail, the handle being formed from a metal, wherein the front rail and the second side rail are formed from a plastic material, the front face of the body of the front rail including a locking channel at the first end portion of the front rail, and wherein the first side rail is formed from a metal and includes a locking tab extending perpendicular to a body of the first side rail along the transverse direction, the first side rail being connected to the first end portion of the front rail via engagement of the locking tab within the locking channel, wherein the retainer is formed from a metal and is affixed to the back face of the front rail opposite the locking tab, and the fastener is engaged with the retainer and the locking tab such that the body of the front rail is clamped between the retainer and the locking tab.

14. The electronic device of claim 13, wherein the front rail and the second side rail are integrally formed from a polycarbonate.

15. The electronic device of claim 13, wherein the first side rail is formed from a die cast zinc.

16. A method of assembling the hybrid drive carrier of claim 1, the method comprising:
- positioning the first side rail, which is part of a first frame section, substantially perpendicular to the first end portion of the front rail, the front rail being part of a second frame section, the second frame section including the second side rail extending perpendicularly from the second end portion of the front rail;
- connecting the first frame section to the second frame section by sliding the locking tab at an end of the first side rail into the locking channel within the first end portion of the front rail, the first frame section and the second frame section together forming the frame configured to receive and carry a media drive; and
- securing the first frame section to the second frame section by engaging the fastener with the retainer and the locking tab such that the body of the front rail is clamped between the retainer and the locking tab;
- wherein the first frame section is formed from a die cast zinc and the second frame section is formed from a polycarbonate.

17. The method of claim 16, further comprising heat staking the retainer to the front rail.

18. The method of claim 17, wherein the fastener is a screw and engaging the fastener with the retainer and the locking tab comprises, after heat staking the retainer to the front rail, inserting the screw through aligned holes in the retainer and the front rail, and fastening the screw into the locking tab.

19. The method of claim 16, wherein sliding the locking tab into the locking channel comprises engaging one or more retention hooks molded into the first end portion of the front rail with one or more corresponding hook receptacles molded into the first side rail.

20. The method of claim 16, further comprising, after connecting the first frame section to the second frame section:
- fitting a tang on a handle within a space formed by a clevis at the end of the first side rail, wherein fitting the tang within the space comprises aligning holes in the tang with holes in the clevis, and
- inserting a pin within the aligned holes of the tang and clevis to pivotably connect the handle to the frame.

\* \* \* \* \*